United States Patent [19]

Lyons, Jr.

[11] 4,207,580

[45] Jun. 10, 1980

[54] MATRIX PRINTING CHART PAPER

[75] Inventor: Joseph N. Lyons, Jr., Monson, Mass.

[73] Assignee: Ludlow Corporation, Needham Heights, Mass.

[21] Appl. No.: 929,061

[22] Filed: Jul. 28, 1978

[51] Int. Cl.² .................... G01D 15/24; B42D 15/00
[52] U.S. Cl. ................................. 346/136; 283/1 A
[58] Field of Search ............... 283/1 A, 34; 346/136, 346/1

[56] References Cited

U.S. PATENT DOCUMENTS

| | | | |
|---|---|---|---|
| 1,608,590 | 11/1926 | Friedman | 283/1 A |
| 2,655,426 | 10/1953 | Barnes, Jr. | 346/136 X |
| 3,299,435 | 1/1967 | Dawe et al. | 346/136 |

Primary Examiner—George H. Miller, Jr.
Attorney, Agent, or Firm—Robert A. Cesari; John F. McKenna; Andrew F. Kehoe

[57] ABSTRACT

A process for improving the readability of a data-recording line on a chart recording paper whereby the improvement is achieved by moving the recording line across a field largely composed of a matrix of dots. The procedure is particularly advantageous in improving the readability of thin lines achievable with pressure-responsive or thermographic paper, but it is also advantageous when common inking procedures are used. A novel chart paper consisting of a dot matrix format is also disclosed.

11 Claims, 2 Drawing Figures

MATRIX PRINTING CHART PAPER

BACKGROUND OF THE INVENTION

This invention relates to a process for improving the readability of data on recording paper and, also, to an improved recording chart paper.

Chart recording papers have been rather standard in design for a long time. In general, they usually comprise vertical and horizontal lines which are appropriately placed to represent the numerical scale whether it be a conventional arithmetic progression, a logarithmic scale, or the like. Similarly, such lines are appropriately oriented on tertiary diagrams wherein the lines are related to one another at acute angles, since they originate at the sides of a triangle.

More recently, the development of improved recording papers, e.g. pressure-sensitive and thermographic papers, have increased the speed at which paper may be recorded. In some instances, however, the speed is limited by the need to avoid excessively light recording lines. Such lines tend to make the reading of the charts a relatively difficult task, increase fatigue of those whose job it is to interpret the graphs, and increase the chance of error.

Therefore, there has been a need in the art of a chart marking process that would result in a more readable recording.

SUMMARY OF THE INVENTION

A principle object of the invention is to provide an improved process for marking a chart paper of the type comprising at least two axes of reference disposed at angles to one another.

A further object of the invention is to provide a novel recording chart sheet for use in the aforesaid process.

A further object of the invention is to provide a novel thermographic or pressure-sensitive sheet which is susceptible to a more accurate reading when processed, according to the invention disclosed herein.

A futher object of the invention is to provide a more easily readable recording chart paper and record made thereon.

Other objects of the invention will be obvious to those skilled in the art on their reading of this invention.

Although the replacement of conventional intermediate lines on recording charts with dots is of great value, it is also to be noted that such replacement makes it feasible to reduce the width of primary or indexing lines, i.e. lines which have heretofore been thicker than the intermediate lines and have been used to reference the chart reader to every fifth or tenth line, etc. In the process of the present invention, the primary lines no longer are required to be thicker than intermediate lines to allow a quick visual orientation of the reader to a reference point. The primary lines can be very thin because they no longer compete for visual impact with other lines. Advantageously, the primary lines will not be larger in diameter than the dots. These thinner reference, or primary lines provide an important additional improvement in data readability.

By "dots" is meant a point marking means. Round dots are satisfactory; however, very small crosses, circles, triangles, or other visual equivalents to dots may be used. "Continuous lines" are to be defined not only as those that are continuous in fact, but also those which are the visual equivalent of continuous lines, whether or not they are interrupted by short voids which may serve some special purpose (such as providing a space for pre-printed data) or which may serve no purpose at all.

The above objects have been substantially achieved by providing a recording field which has only a minor number of the lines defining a given parameter (most conveniently no more than one out of four, and, preferentially, fewer than one out of four) defined by continuous straight lines.

The "other" lines are defined, where there are no continuous-line intersections, by dots. Thus, the recording chart appears to be a matrix of polygons in which dots are distributed indicating the intersectional points of parameter-defining lines, now only imaginary lines, running across the recording paper.

When the operator places his linear, data-representing, line on a recording field such as described, the line is more easily and accurately read in the first instance and, as one continues to read such charts over a period of time, one is able to read with more accuracy and less fatigue. Moreover, chart paper that is speed sensitive, e.g. thermographic paper, can be operated faster and resulting fainter lines can be read more easily and accurately than is possible with the fully-lined recording field of the prior art.

ILLUSTRATIVE EMBODIMENTS OF THE INVENTION

In this application and accompanying drawings there is shown and described a preferred embodiment of the invention and suggested various alternatives and modifications thereof, but it is to be understood that these are not intended to be exhaustive and that other changes and modifications can be made within the scope of the invention. The suggestions herein are selected and included for purposes of illustration in order that others skilled in the art will more fully understand the invention and the principles thereof and will be able to modify it and embody it in a variety of forms, each as may be best suited in the condition of a particular case.

Figure 1:
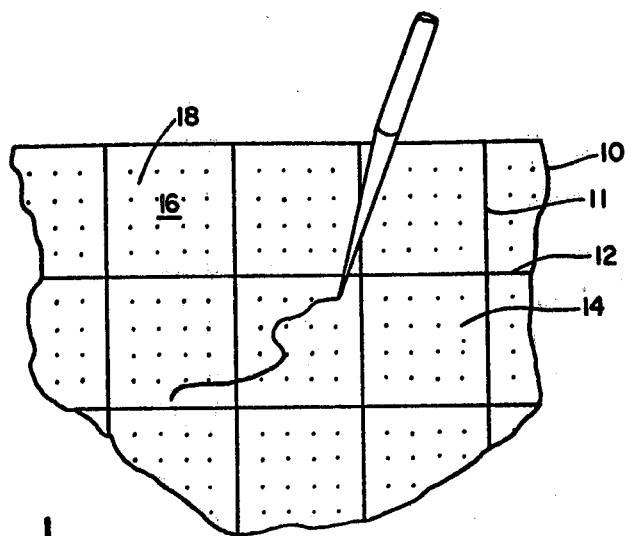
FIG. 1 is a representation of a typical graph paper of the invention at about 25 times, in terms of area, its actual scale.

Referring to FIG. 1, it is seen that a pressure sensitive recording sheet 10 comprises primary, vertical lines 11, and primary horizonal lines 12. These are continuous, but occur only at each tenth increment of distance. Between the primary lines 11 and 12 are dots 14 which occur at the intersectional points of imaginary lines and thus form an evenly spaced matrix of dots within the field 16 defined by the polygons 18.

Figure 2:
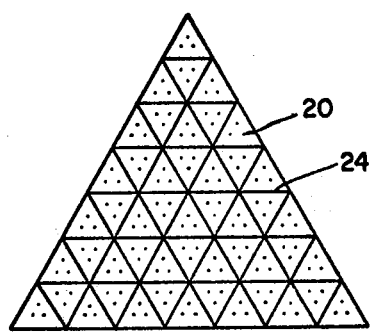
FIG. 2 is illustrative of a recording chart of the invention which is suitable for ternary diagrams.

FIG. 2 illustrates a similar "graph paper" background having a ternary plot, e.g. as would be used in describing a number of alloys all comprised of different combinations of the same three metals. Again, the dots 20 are positioned at the intersectional points of imaginary lines between primary lines 24 which help to orient the chart reader. Thus, there is a matrix of dots 20 within each triangle formed by lines 24.

The importance of this background, especially when used in conjunction with a thermographic or pressure-sensitive recording sheet, is that the dots allow a more exact interpolation and comparison of recorded lines while the absence of conventional lining allows easier reading of the lines especially under conditions where rapid excursions of the recording stylus have resulted in a relatively light record.

It is also to be understood that the following claims are intended to cover all of the generic and specific features of the invention herein described and all statements of the scope of the invention which might be said to fall therebetween.

What is claimed is:

1. A process for recording data using a stylus for marking a recording sheet wherein said marking comprises forming a continuous line of data on a background formed of
   (a) matrices of dots, said dots being evenly spaced to represent pre-determined, incremental, data-representing quanta, and
   (b) wherein said matrices of dots are enclosed by primary lines defining a polygon.

2. A process as defined in claim 1 wherein said data represents an electrocardiagram.

3. A process as defined in claim 1 or 2 wherein said sheet is a thermographic recording sheet.

4. A process as defined in claim 1 or 2 wherein said process is a pressure-sensitive recording sheet.

5. A process as defined in claim 1 wherein said dots appear in matrices of from 16 to 81.

6. A process as defined in claim 1, 2, or 5 wherein said primary lines are not substantially wider than the diameter of said dots.

7. A process as defined in claim 4 wherein said primary lines are not substantially wider than the diameter of said dots.

8. A process as defined in claim 5 wherein said primary lines are not substantially wider than the diameter of said dots.

9. A chart recording paper comprising, as part of the recording surface thereof, a series of matrices of dots, said matrices bounded by primary lines forming a polygon around said matrices.

10. A recording paper as defined in claim 7 wherein said primary lines have a width which is about as wide as the diameter of said dots or is thinner than the diameter of said dots.

11. A recording paper as defined in claim 7 or 8 wherein said paper is pressure or thermally-activated by a recording stylus.

* * * * *

UNITED STATES PATENT AND TRADEMARK OFFICE
CERTIFICATE OF CORRECTION

PATENT NO. : 4,207,580
DATED : June 10, 1980
INVENTOR(S) : Joseph N. Lyons, Jr.

It is certified that error appears in the above-identified patent and that said Letters Patent are hereby corrected as shown below:

Column 4, line 9: change "claim 5" to --claim 3--;

Column 4, line 16: change "claim 7" to --claim 9--;

Column 4, line 20: change "claim 7 or 8" to --claim 9 or 10--

Signed and Sealed this

Fourth Day of November 1980

[SEAL]

Attest:

SIDNEY A. DIAMOND

Attesting Officer

Commissioner of Patents and Trademarks